United States Patent [19]

Dhein et al.

[11] Patent Number: 5,159,453

[45] Date of Patent: Oct. 27, 1992

[54] VIDEO PROCESSING METHOD AND APPARATUS

[75] Inventors: Robert Dhein, Fort Lauderdale, Fla.; Gregory Glass, Sea Cliff, N.Y.; Albert Cerullo, Glen Cove, N.Y.; Louis Schure, Albertson, N.Y.

[73] Assignee: New York Institute of Technology, Old Westbury, N.Y.

[21] Appl. No.: 579,146

[22] Filed: Sep. 7, 1990

[51] Int. Cl.[5] .......................... H04N 7/08; H04N 11/06
[52] U.S. Cl. ...................................... 358/142; 358/12; 358/141
[58] Field of Search .................. 358/12, 141, 142, 183, 358/22

[56] References Cited

U.S. PATENT DOCUMENTS

| | | | |
|---|---|---|---|
| 4,517,597 | 5/1985 | Glenn | 358/141 |
| 4,628,344 | 12/1986 | Glenn | 358/12 |
| 4,652,909 | 3/1987 | Glenn | 358/12 |
| 4,661,862 | 4/1987 | Thompson | 358/335 |
| 4,701,783 | 10/1987 | Glenn | 358/12 |
| 4,713,688 | 12/1987 | Güttner | 358/141 |
| 4,780,761 | 10/1988 | Daly et al. | 358/133 |
| 4,800,426 | 1/1989 | Glenn | 358/141 |
| 4,829,367 | 5/1989 | Dubois et al. | 358/12 |
| 4,866,519 | 9/1989 | Lucas et al. | 358/141 |
| 4,907,069 | 3/1990 | Bretl | 358/12 |
| 4,961,112 | 10/1990 | Sugimori et al. | 358/141 |
| 4,965,661 | 10/1990 | Lucas | 358/12 |

OTHER PUBLICATIONS

W. Glenn, K. Glenn, C. Bastian, "Imaging System Design Based on Psychophysical Data", Proc. of SID, vol. 26/I, pp. 71–78 (1985).
"Visual Pschological Factors as Applicable to the Design and Development of Video Systems for Use in Space", NYIT Final Rept. to NASA, (May 1989).
R. C. Gonzales et al., "Digital Image Processing" Addison-Wesley, pp. 80–83 (1987).
E. Dubois et al. "Three Dimensional Spectrum and Processing of Digital NTSC Color Signals", SMPTE J, (Apr. 1982).
B. Wendlund et al. "On Picture Quality of Some TV Signal Processing Techniques", SMPTE J, (Oct. 1984).
W. E. Glenn, "HDTV Compatible Transmission System", National Association of Broadcasters, Apr., 1986.
W. E. Glenn, "Compatible Terrestrial HDTV Transmission", NAB Engineering Conference Proceedings, Apr., 1986.
M. A. Isnardi et al., "Advanced Compatible Television, A Progress Report" SMPTE Journal, Jul., 1989.
W. F. Schreiber et al., "Reliable EDTV/HDTV Transmission in Low-Quality Analog Channels" SMPTE Journal, Jul., 1989.

Primary Examiner—John K. Peng
Attorney, Agent, or Firm—Martin Novack

[57] ABSTRACT

A method and apparatus is disclosed for combining a first video signal representative of a first image and a second video signal representative of a second image. In one embodiment, the first video signal is filtered to remove high frequency two-dimensional diagonal frequency components therefrom. The second video signal is also filtered to remove high frequency two-dimensional diagonal frequency components therefrom. The filtered second video signal is two-dimensionally modulated, and the filtered first video signal is combined with said modulated filtered second video signal. In a further embodiment, filtered signals are spatially decimated and combined.

36 Claims, 17 Drawing Sheets

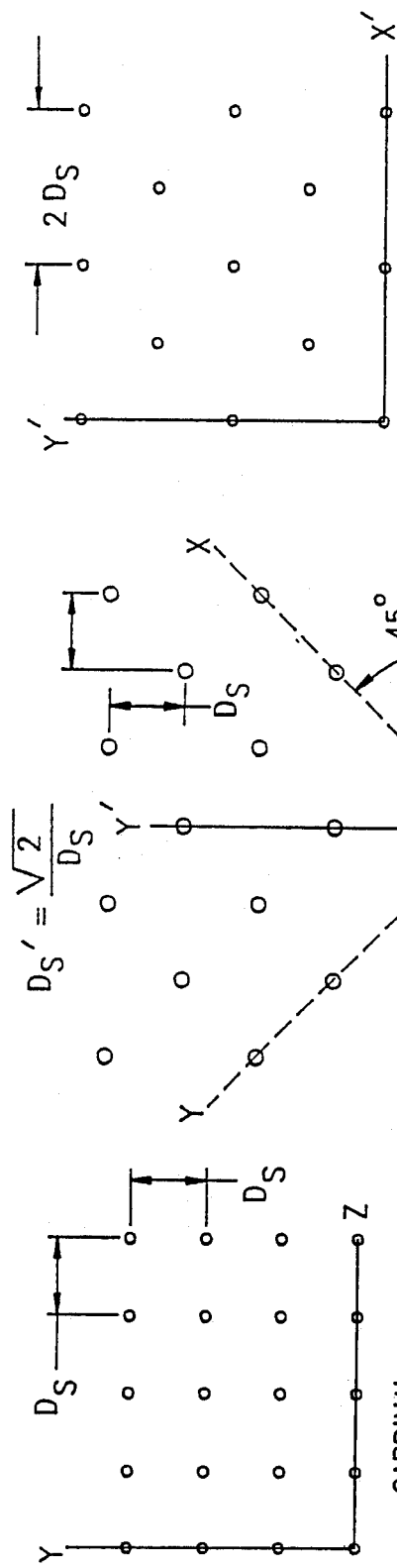
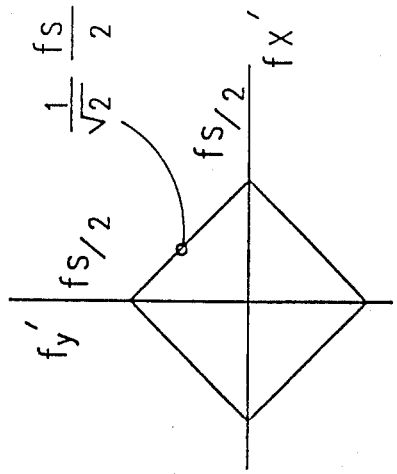
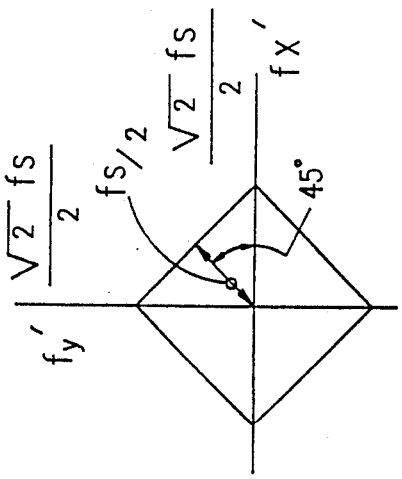
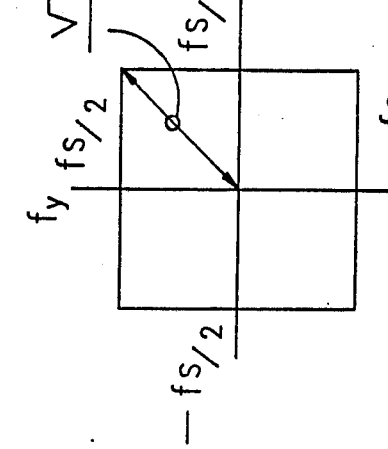
Fig. 3A — CARDINAL
Fig. 3B — QUINCUNX
Fig. 3C — QUINCUNX WITH SAMPLE RATE REDUCED BY $\sqrt{2}$ IN BOTH X' & Y'
Fig. 4A
Fig. 4B
Fig. 4C

```
-5   -5    0    -2    0    -2    0    -5   -5
 0   29  -40   -97    5   -97  -40   29    0
-2   -3  -97    56  412    56  -97   -3   -2
 0   16    5   412 1000   412    5   16    0
-2   -3  -97    56  412    56   97   -3   -2
 0   29  -40   -97    5   -97  -40   29    0
-5   -5    0    -2    0    -2    0    -5   -5
```

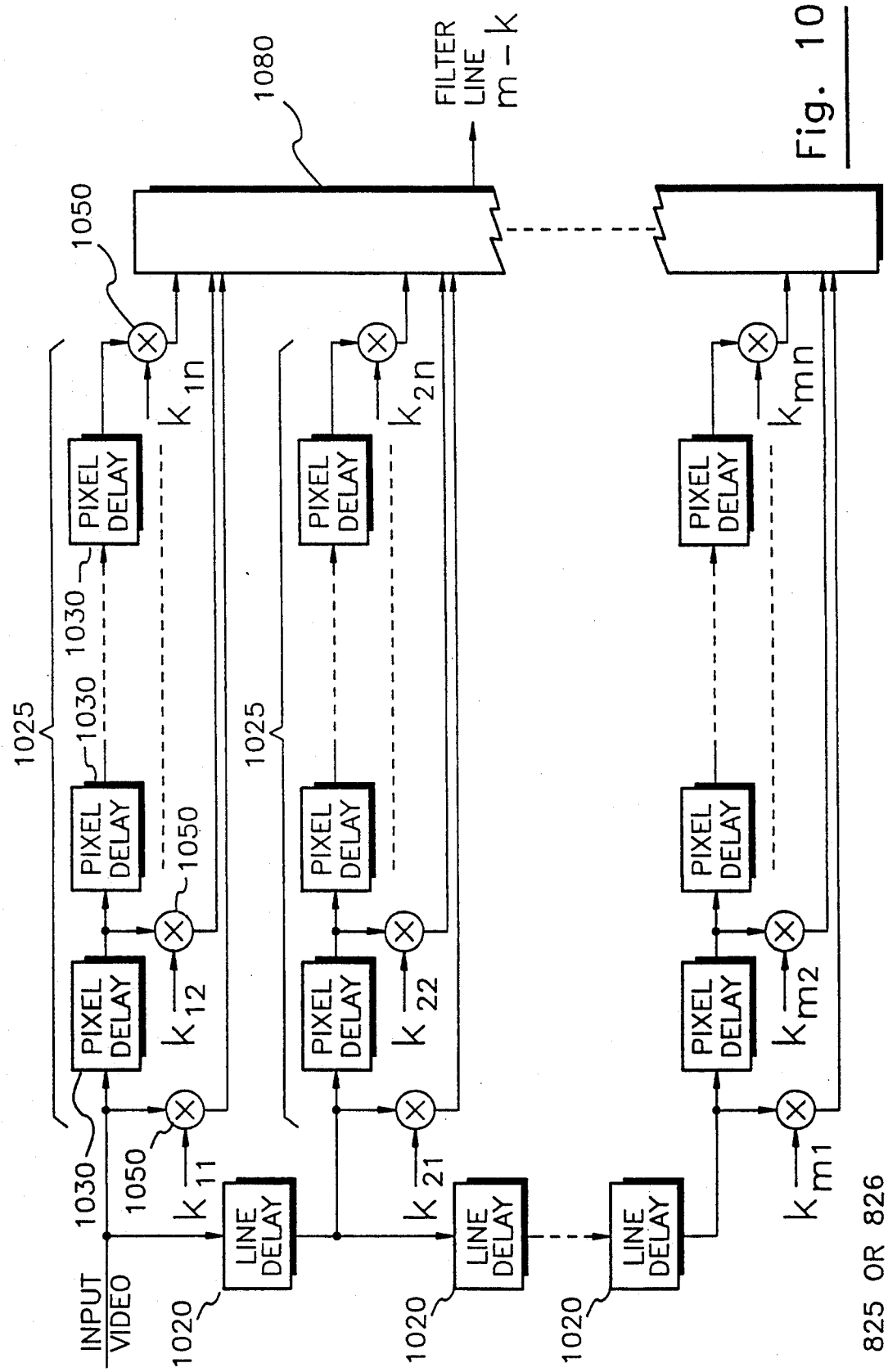

——— COMPONENT
------ ALIAS

——— COMPONENT
------ ALIAS

——— INPUT
------ ALIAS

● — CENTER OF FUNDAMENTAL
    SAMPLED SPECTRUM
X — CENTER OF REPEATED SPECTRAL
A) — ALIAS SPECTRUM OVERLAP FOR
    DIAGONALLY DECIMATED IMAGES

NO SPECTRAL OVERLAP OCCURS
WHEN SPECTRAL COMPONENTS ARE
PRE-FILTERED TO RESIDE WITHIN
THE DIAMOND SHAPED REGION.

VIDEO PROCESSING METHOD AND APPARATUS

FIELD OF THE INVENTION

This invention relates to video signals and, more particularly, to apparatus and method for encoding and decoding video signals for use in television and in high definition television systems as well as in other applications including storage and/or transmission, over any suitable medium, of moving images, or combinations of moving and still images, in a form that requires reduced storage capacity and/or reduced bandwidth channels. The techniques hereof can be employed, for example, for transmitting through the air or through conducting or optical cable, a plurality of video signals using only the bandwidth generally allocated to a single video signal, and with little or no perceived degradation of image quality. The techniques hereof can be employed, for example, in so-called "compatible" high definition television approaches, as in so-called "simulcast" approaches wherein independent high definition television signal is sent simultaneously with a conventional transmission of the same program information. Some of the techniques hereof can also be employed in so-called "enhanced definition" approaches that send picture enhancement information (but less than the information needed for full high definition performance) on the same channel with a conventional television program.

BACKGROUND OF THE INVENTION

Available spectrum is becoming increasingly burdened by ever greater demand for video information channels. Traditional airwave spectral space has been crowded for many years, and burgeoning video programming for such applications as home cable, teleconferencing, picture phones, and computer video transmission has now crowded conductive and optical cables, phone lines, and sattelite communication channels. The desirability of techniques for increasing the amount of video information that can be sent over these transmission media is evident. Also, as more video information is stored, it is desirable to develop techniques that increase the amount of video that can be stored in a given storage size.

As high definition television (HDTV) becomes more prevalent, improved systems are needed for transmission and reception of the additional information required for presenting HDTV images. Any new service which provides higher definition television than is conventionally broadcast (i.e., more elements per line and lines per frame, and thus a wider bandwidth necessary for transmission) should serve existing home television receivers with essentially all the picture attributes and quality of which the receivers are capable. Also, receivers designed for new (high definition) service, should be capable of operating using the pre-existing transmissions and derive from them a result not inferior to that provided by pre-existing receivers.

A variety of HDTV schemes have been proposed. In U.S. Pat. Nos. 4,517,597, 4,628,344, 4,652,909 and 4,701,783, and 4,800,426, assigned to the same assignee as the present application, as well as in the publication "HDTV Compatible Transmission System", W. E. Glenn, National Association of Broadcasters, April, 1986, there is disclosed an HDTV system that utilizes an augmentation approach which permits compatible transmission of HDTV. A separate auxiliary or "augmentation" channel is used to send picture detail information that augments conventionally received television information to obtain high definition performance. The disclosed techniques also have application to video bandwidth compression and to reducing video storage capacity.

As described in the referenced patents and publication, an electronic video signal (e.g. a television signal) can be encoded at reduced bandwidth by lowering the frame refresh rate of the high spatial frequency components, while maintaining the frame refresh rate of at least a portion of the low spatial frequency components at the standard rate. If done in a specified manner this will not cause substantial degradation in the ultimately displayed image, since human vision cannot perceive changes in high spatial resolution information at as fast a rate as it can perceive changes in low spatial resolution information. Accordingly, as has been previously set forth, an electronic video encoding and decoding system can be devised which takes advantage of this, and other, characteristics of human vision by encoding higher spatial resolution video components to be at a temporal information rate which approximately corresponds to the highest rate actually perceived by human vision for such components; thereby eliminating the need to encode these components at a higher rate, which inherently wastes bandwidth. Also, as shown in referenced patent and publication, the low spatial resolution information can be generated in a form which is compatible with standard television video, for example NTSC video used in the U.S. It has also been recognized that a number of frequency components can be transmitted at specified rates [see e.g. W. F. Schreiber et al., Reliable EDTV/HDTV Transmission In Low Quality Analog Channels, SMPTE Journal, July 1989, and the abovereferenced patents of the present assignee], with components selected according to degree of motion in order to have higher spatial resolution in scenes with little motion and higher temporal resolution in scenes with a great deal of motion.

FIG. 1 illustrates a compatible high definition television transmission and receiving system of the general type described in the above-referenced patents and publication. A transmitter 200 includes NTSC processing circuitry 210 which processes television signals from a source such as a television camera system (not shown) or a video recording system (not shown). The circuitry 210 is coupled to transmitting circuitry 215, which typically includes modulation circuitry and other suitable circuitry for producing a signal to be transmitted over a standard NTSC channel. The television signals from the television camera system or video recorder (which is assumed to have a high definition video capability) are also processed by high definition television (HDTV) processing circuitry 260 which produces detail signals that can be utilized to enhance conventional television signals to obtain HDTV signals, as described in the abovereferenced patents and publication. (As further described in the referenced U.S. Pat. No. 4,652,909, the detail signal can be obtained from a separate camera.) The detail signals are coupled to further circuitry 275, which transmits the detail signal over a second (auxiliary) channel that is typically not adjacent to the (main) NTSC channel used for transmission of the standard portion of the television information. The NTSC signal is received by receivers such as receiver 310 which has only a capability of producing a television picture at substantially conventional resolution e.g. conventional display 315. Receivers such as receiver 360, which have a capability for receiving, processing, and displaying high definition television signals, receive both the main channel carrying the NTSC signal and the auxiliary channel carrying the detail signals to be used for augmentation of the NTSC video signal so as to produce a high definition television signal for display on an HDTV display 365.

In copending U.S. patent application Ser. No. 502,519 of R. Dhein filed Mar. 30, 1990, and assigned to the same assignee as the present invention, there is disclosed a method and apparatus for encoding (for storage and/or transmission) and decoding video to achieve bandwidth compression. In a disclosed embodiment of that Application, information content is reduced by eliminating high diagonal frequency components of video, spectral transforms are utilized, and frequency bands of detail signal are selected for each tile of the picture depending on the motion status of the particular tile.

As further background to the invention, reference can be made to the following U.S. Patents which relate to compression, transmission and/or other processing of video signals and/or still picture information:

| U.S. Pat. No. | 4,196,448 |
|---|---|
| | 4,210,931 |
| | 4,224,678 |
| | 4,302,775 |
| | 4,394,774 |
| | 4,541,012 |
| | 4,605,952 |
| | 4,630,099 |
| | 4,661,862 |
| | 4,672,425 |
| | 4,675,733 |
| | 4,675,750 |
| | 4,729,012 |
| | 4,774,561 |
| | 4,780,761 |
| | 4,791,598 |
| | 4,807,029 |
| | 4,821,119 |
| | 4,845,562 |
| | 4,851,906 |
| | 4,870,489 |
| | 4,873,573 |

The FCC recently announced that it prefers planned terrestrial HDTV transmission in the U.S. to be broadcast using a simulcast format: i.e., with the same program content sent simultaneously both a conventional television channel and a separate HDTV channel. It has been anticipated that, in time, television viewers will replace standard NTSC receivers with high definition sets, thereby allowing the present NTSC channels to eventually be reassigned for other application. In order for this concept to work, however, viewers must be motivated to purchase receivers designed to accept this new format. Even when wide-screen HDTV becomes available, a significant demand will always exist for smaller-screen receivers. The image quality of small screen-size television receivers is generally not limited by transmission considerations, but by human visual acuity. The optimum viewing distance for popular 19–20" conventional receiver, for example, is between six and seven feet. A similar screen-size HDTV receiver has an optimum viewing distance of about three feet; clearly impractical in most viewing situations. The goal of abandoning the conventional NTSC channels in the foreseeable future may be impractical because there will always be a consumer demand for inexpensive smaller screen television sets.

It is among the objects of the present invention to provide improvements in encoding and decoding of video information which addresses the described problems and limitations of the prior art, achieves substantial bandwidth savings, increases the efficiency of video transmission and storage, and provides a capability for higher definition television transmission in the bandwidth of a single conventional television channel. It is also among the objects of the present invention to provide a technique whereby two video signals, representative of different images can be transmitted using only the bandwidth generally allocated to a single video signal, with little or no perceived degradation of image quality. It is also among the objects of the present invention to provide a method for broadcasting video signals with improved interference immunity.

BRIEF DESCRIPTION OF THE DRAWINGS

FIGS. 3A, 3B and 3C respectively illustrate cardinal sampling, quincunx sampling, and quincunx sampling with reduced sampling rate.

FIGS. 4A, 4B and 4C respectively illustrate spectra for the FIG. 3A, 3B and 3C situations.

FIG. 10 is a block diagram of circuit which can be utilized to implement two-dimensional convolution with a filter kernel.

DESCRIPTION OF THE PREFERRED EMBODIMENTS

Figure 1:
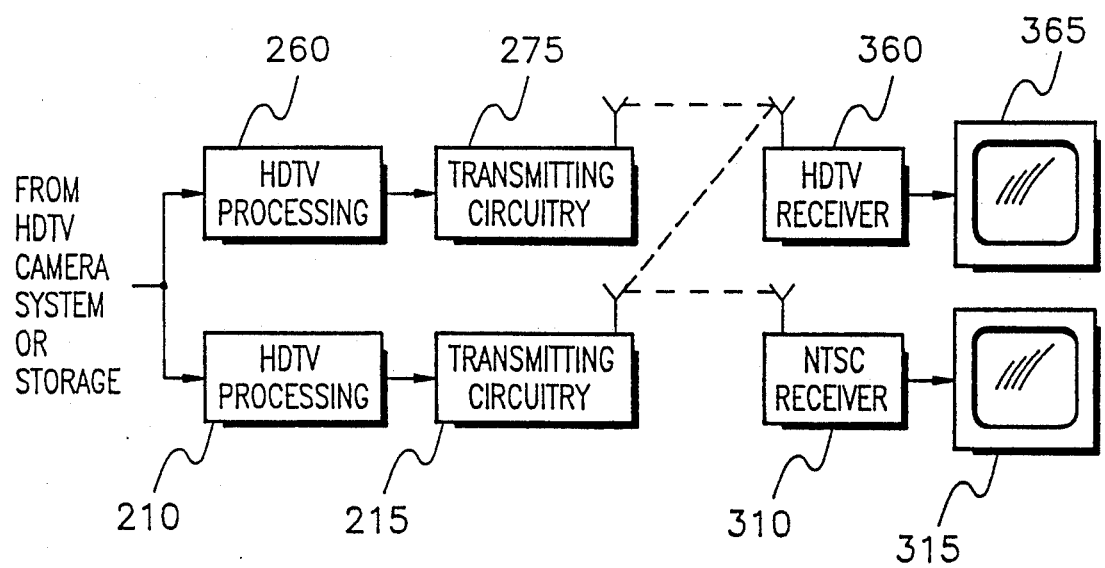
FIG. 1 is a simplified block diagram of a prior compatible high definition television system.
Figure 2:
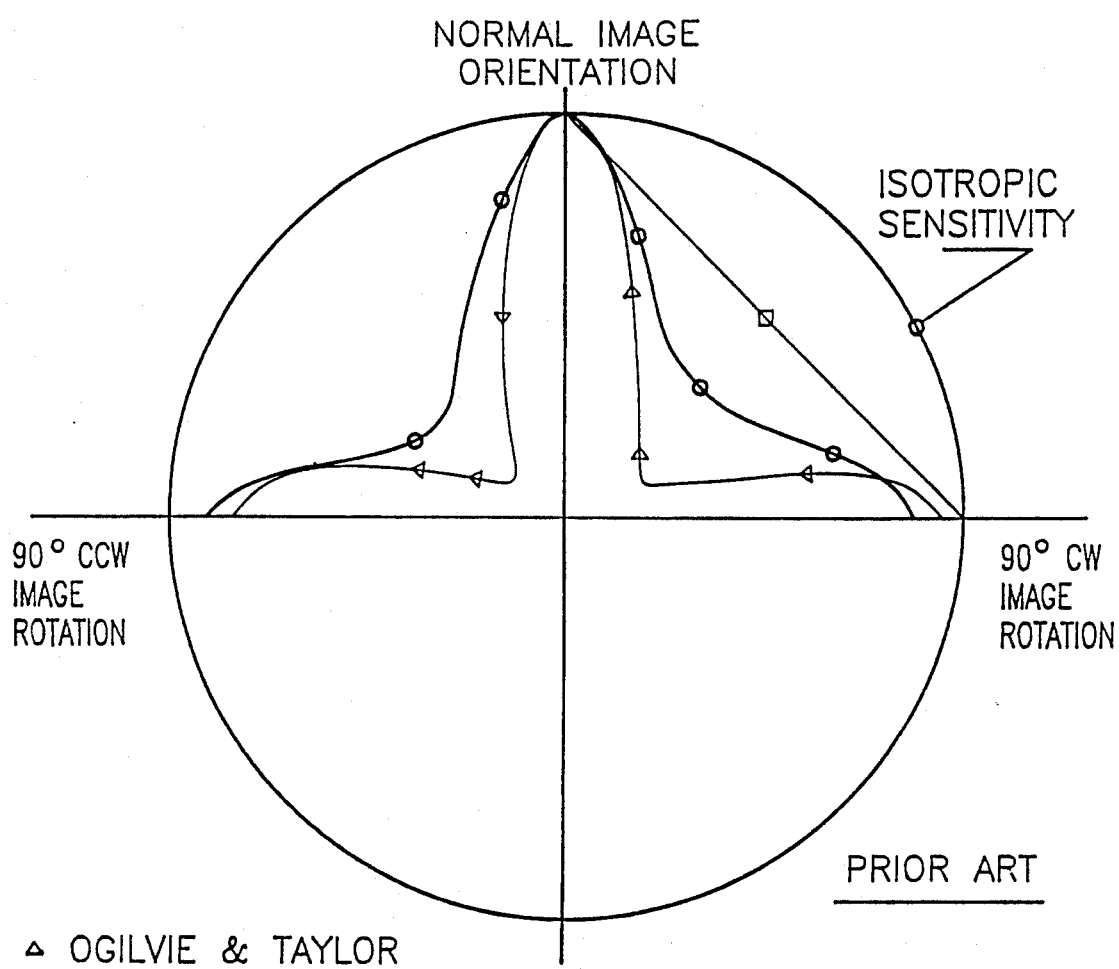
FIG. 2 is a polar plot illustrating data that measures the oblique effect.
Figure 5:
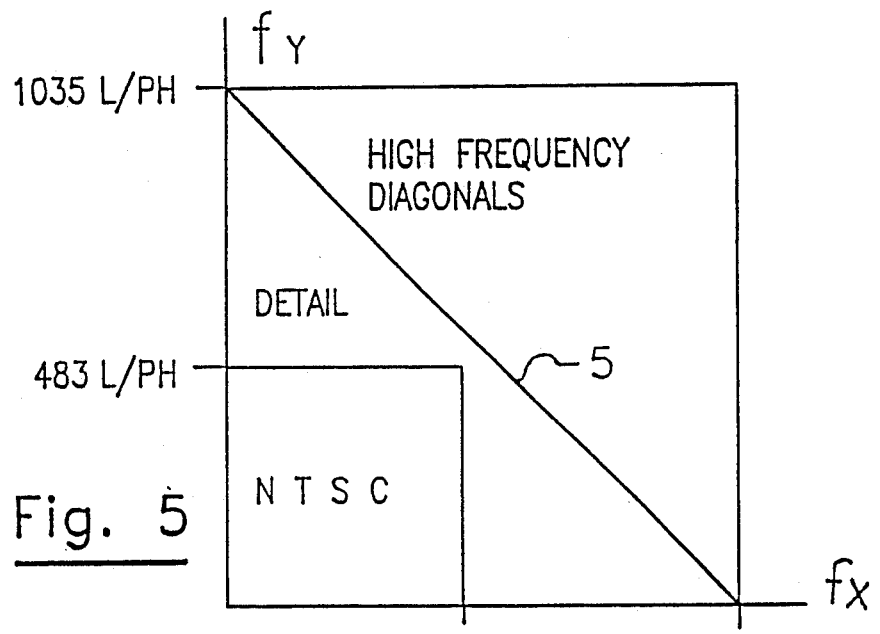
FIGS. 5 and 6 illustrate spectra of a prior system.
Figure 6:
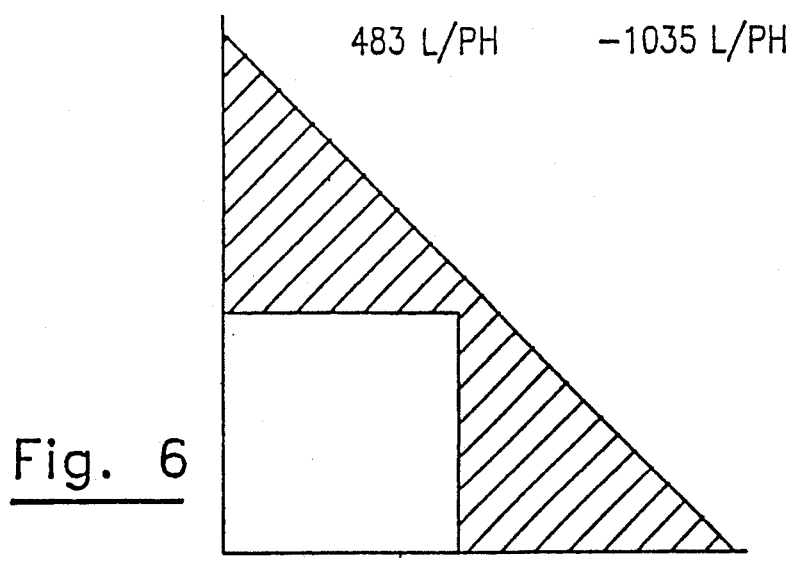

Subjective vision studies have indicated that perceived resolution is anisotropic (not equally precise in all directions). The eye is more sensitive to detail along the horizontal and vertical axes than to that along diagonals. [See, for example, W. E. Glenn et al., "Imaging System Design Based On Psychophysical Data," Proc. of the SID, Vol 26/1, pp. 71-78, Jan. (1885); NYIT STRC "Visual Psychophysical Factors as Applicable to the Design and Development of Video Systems for Use in Space, Final Report," NASA Report, May (1989); G. C. Higgins et al., "Variation of Visual Acuity with Various Test-Object Orientations and Viewing Conditions," J. Opt. Soc. Am. 40, pp. 135-137 (1950); F. W. Campbell et al., "Orientational Selectivity of the Human Visual System," J. Physiol., 187, pp. 437-445, (1966); and S. Appelle, "Perception and Discrimination as a Function of Stimulus Orientation: The "Oblique Effect" in Man and Animals," Psychological Bulletin, Vol. 78, No. 4, pp. 266-278, (1972).] FIG. 2 illustrates this oblique effect, plotted in polar form, as characterized by various researchers. While results differ somewhat due to the different types of testing employed, the curves of subjective resolution have a similar shape and diverge from the isotropic resolution shown by the outer circle. It is known that bandwidth and display element density can be reduced by taking advantage of the anisotropic spatial response characteristics of the visual system. FIGS. 3A, 3B and 3C respectively illustrate cardinal sampling, quincunx (or diagonal) sampling, and quincunx sampling with reduced sampling rate. FIGS. 4A, 4B and 4C show the respective discrete spectra for the sampling of FIGS. 3A, 3B and 3C, where $f_s=1/D$. The quincunx sampling shown in FIGS. 3B and 3C results in the rotation of the spectral coordinate axes by 45 degrees [see, for example, R. C. Gonzales et al., Digital Image Processing, Reading Mass., Addison-Wesley (1987); E. Dubois et al., "Three-Dimensional spectrum and Procession of Digital NTSC Color Signals," SMPTE Journal, pp. 372-378, April (1982); and B. Wendland et al. "On Picture Quality of Some Television Signal Processing Techniques," SMPTE Journal, pp. 915-922, Oct., (1984)], thereby more closely matching the characteristics of vision. This method can be used to reduce the information content by a factor of two without degradation in perceived image quality. Half tone prints and, more recently, CCD cameras and LCD displays are successfully utilizing this technique. Some of the systems described in the patents referenced in the Background portion hereof utilized quincunx sampling to reduce the sampling rate, and therefore the augmentation bandwidth, by a factor of two. In the above referenced U.S. patent application Ser. No. 502,519 of R. Dhein, assigned to the same assignee as the present application, information content is reduced by eliminating high diagonal frequency components approximately to the upper right of the diagonal line 5 in the discrete spectral domain illustrated in FIG. 5. The NTSC luminance spectrum is illustrated approximately in the lower lefthand box of FIG. 5. In an embodiment of the referenced Application, for an augmentation system wherein the NTSC spectral portion is available from a conventional channel, the approximate remaining spectrum used for transmission on the augmentation channel is shown in the shaded region of FIG. 6.

Figures 7, 9:
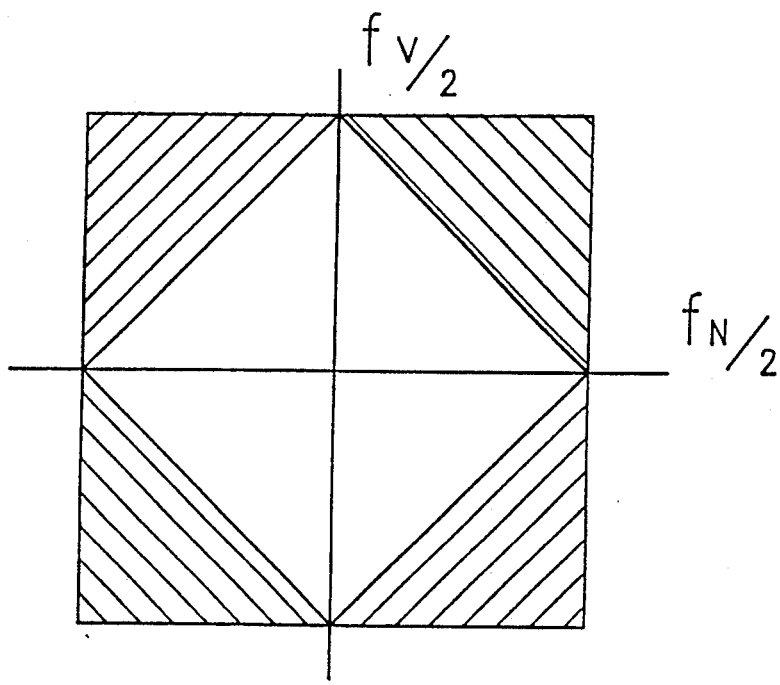
FIG. 7 illustrates the four quadrant pass band of a two-dimensional diagonal filter having its vertical and horizontal cutoff frequencies at half the video sampling rate.
FIG. 9 illustrates an example of the coefficients of a 9×7 filter kernel array.

A low-pass filter can be used to restrict the frequency components of a cardinally sampled image to the region within the diamond-shaped perceptivity curve of FIG. 2. A television viewer, positioned at the most favorable viewing distance (roughly six screen heights for conventional NTSC 525 line video), is not able to resolve the (vertical) video raster, yet is still able to appreciate image detail. FIG. 7 shows the four quadrant pass-band of a two-dimensional diagonal filter having both its vertical and horizontal cutoff frequencies set to one-half the video sample rate (for example, one-half the vertical sampling rate). One-half the total spectral area is passed by this filter. The effective two-dimensional bandwidth for images matched to the characteristics of the human visual system is only one-half of that created by cardinal sampling. In accordance with a feature of the present invention, useful video information is two-dimensionally modulated so as to be positioned in the shaded portion of FIG. 7; i.e., into a spectral region that has been effectively unused and generally wasted in prior art systems. In an embodiment hereof, two different television images, for example, can be encoded on a single transmission channel by effectively placing one in each of the two distinct spectral regions. Applicant has discovered that each television picture can maintain substantially the full subjective resolution found in the original, and is completely separable from the other television picture.

Figure 8:
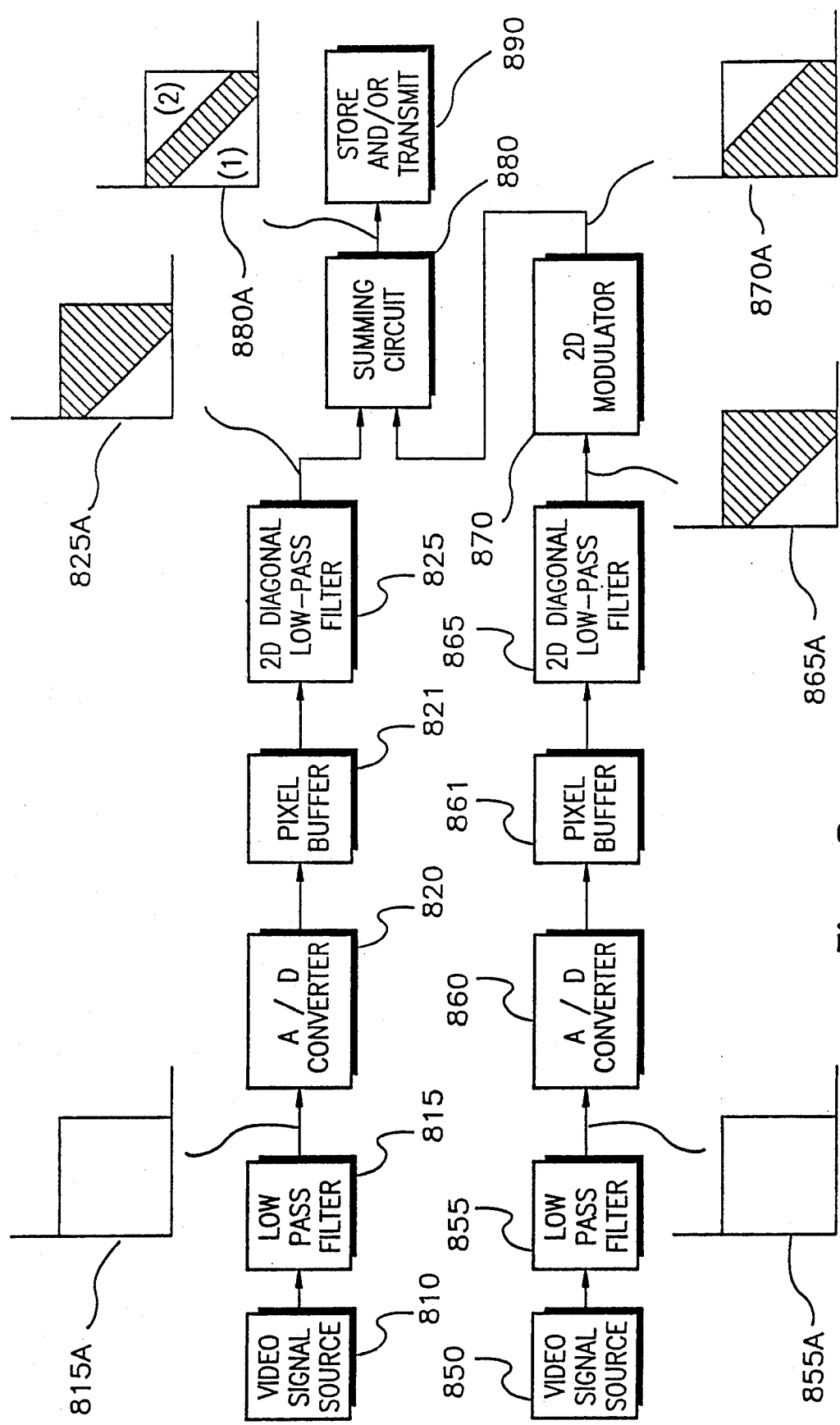
FIG. 8 is a block diagram of an embodiment of an encoder and encoding method in accordance with a form of the invention.

Referring to FIG. 8, there is shown a block diagram of an apparatus in accordance with an embodiment of first form of the invention, and which can be used to practice a form of the method of the invention. Two electronic video signals are produced, as represented by the blocks 810 and 850, respectively. The electronic video signals may be generated by any suitable means, for example by video cameras, video storage, graphics or animation generators, or medical or other imagers, etc. It will be understood that the blocks 810 and 850 may represent respectively different types of sources of electronic video signals. As an illustrative example, it can be assumed that the blocks 810 and 850 represent electronic video camera systems directed at different scenes. As described hereinbelow, the signals can also be representative of different components of the same image. Also, it will become understood that the techniques are applicable to various formats of electronic video signals and to conventional as well as low or high definition video. An example is initially set forth in terms of a monochrome video signal having conventional television resolution, although the techniques hereof are also generally acceptable to color video signals.

The outputs of video signal sources 810 and 850 are respectively coupled to low pass filters 815 and 855 (see also two-dimensional spectra 815A and 855A), and then to analog-to-digital converters 820 and 860. The analog-to-digital converters can be operated at any suitable clock rate, in known fashion, to obtain frames of digital pixels which are stored in digital buffers 821 and 861, respectively. The buffers may be frame buffers or portions thereof. Each pixel of each frame can have a luminance value conventionally represented by an n-bit digital word.

The outputs of frame buffers 821 and 861 are respectively coupled to two-dimensional diagonal low-pass filters 825 and 865. Each of these filters is operative to remove high frequency two-dimensional diagonal frequency components from the frames of digitized video signal. For example, for the approximately square spectrum of the first quadrant FIG. 7, the filtering of the present embodiment will preferably result in a spectrum having an approximately triangular shape as in the unshaded region in FIG. 7 (see also the sketches 825A and 865A). It will be understood, however, that the line joining the highest passed vertical and horizontal frequencies [$(f_{v}/2 + f_{h}/2)$ = constant] can generally be considered as a boundary. [The illustrated diagonal boundary is seen to have the form $(f_v + f_h)$ = constant, where $f_h$ and $f_v$ are, respectively, the maximum horizontal and vertical frequencies in the two-dimensional spectrum.] As noted in conjunction with the description of FIG. 2, there are investigators who have determined that even some frequencies within the indicated triangular region will be substantially attenuated by the human visual system. The precise shape of the filter can be determined from present and/or future studies on the human visual system, and/or can be adjusted empirically.

The two-dimensional diagonal low-pass filter (825 and 865) can be implemented by any suitable technique. For example, a commercial programmable filter kernel can be utilized to obtain the desired filtering function. FIG. 9 illustrates an example of the coefficients of a 9×7 filter kernel array that can be utilized to implement two-dimensional diagonal low-pass filtering. The filter kernel can be applied by convolving the array with the frame of pixels to be filtered. Techniques for implementation of the filtering process, are known in the art. FIG. 10 shows a block diagram of a circuit which can be utilized to implement two-dimensional convolution, and which can be employed, with appropriate weighting coefficients, in the present embodiment to implement a two-dimensional diagonal low pass filter. In the circuit of FIG. 10, an array of coefficients $k_{ij}$, are applied to an (m)x(n) moving group of pixels by using m line delays 1020 and n pixel delays which are indicated in FIG. 10 by representative register rows 1025, each of which has individual stages with respective one pixel delays. Shift registers or FIFOs may be used for this purpose. Each pixel and delayed pixel is multiplied by a coefficient, $k_{ij}$, with the coefficient values being implemented by applying corresponding signal levels to the multipliers 1050. The coefficients can be in accordance with the selected array for a particular filter kernel, for example the array illustrated in FIG. 9. The outputs of multipliers 1050 are summed by a summing circuit 1080 which produces each convolved output signal as the array "moves" over the frame. It will be understood that other filter implementations, including commercially available chips, can be utilized, if desired, and that end conditions can be handled by techniques known in the art.

Figure 11:
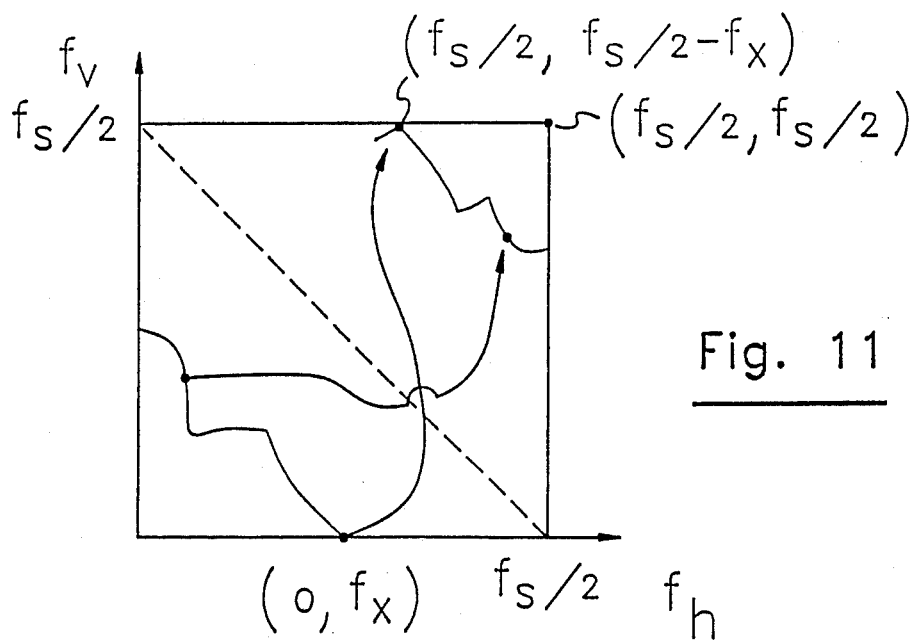
FIG. 11 illustrates an example of two-dimensional spectrum folding around a diagonal which occurs as a result of a two-dimensional image modulating a two-dimensional subcarrier.
Figure 12A:
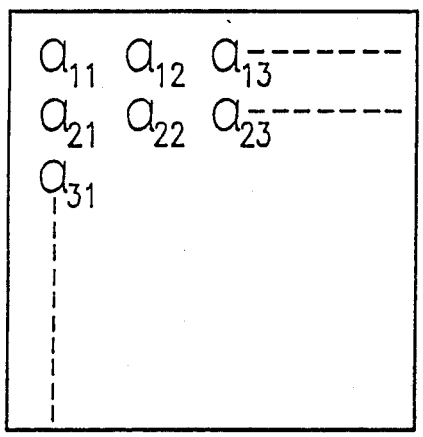
FIGS. 12A and 12B respectively show a pixel array before and after two-dimensional modulation.
Figure 12B:
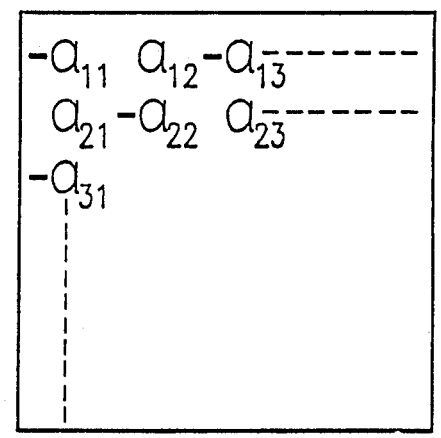
Figure 13:
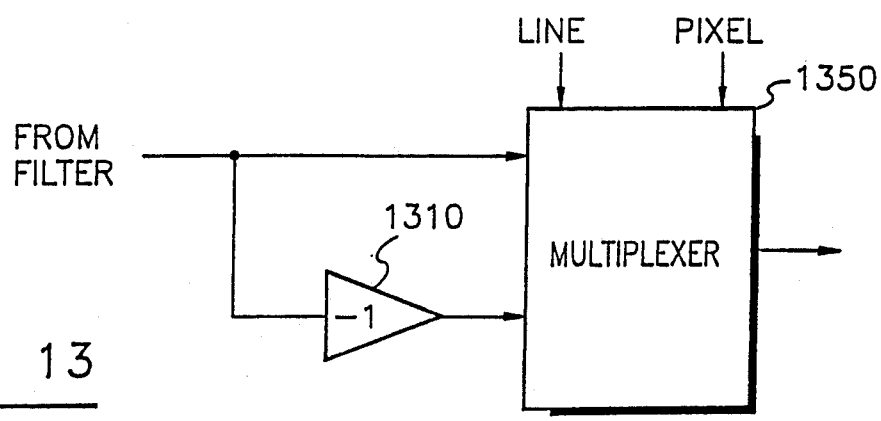
FIG. 13 illustrates a circuit for implementing two-dimensional modulation.

Referring again to FIG. 8, the output of two-dimensional diagonal low-pass filter 825 is coupled to one input of summing circuit 880. The output of two-dimensional diagonal low-pass filter 870 is coupled to a two-dimensional modulator 870, which serves to fold the spectrum of the filtered signal into the spectral space normally occupied by the high frequency diagonal components. FIG. 11 illustrates an example of the two-dimensional spectrum folding which occurs when a two-dimensional image modulates a two-dimensional subcarrier having (in this case) a horizontal frequency of half the sampling rate and a vertical frequency of half the sampling rate. In general, the image spectrum will be folded around the diagonal demarcation line and reversed so that high frequency horizontal components of the original image become high frequency vertical components and vice-versa as shown in FIG. 11. A constant gray level (dc) on the encoded image will then appear as the highest possible frequency which can be represented with the sampling parameters, $f_s/2$, $f_s/2$. In other words, the spectral location (O,O), after such two-dimensional modulation, will be at ($f_s/2$, $f_s/2$) and constant intensity level will generally appear as a high frequency checkerboard pattern. (For this modulation in the image brightness domain, being modulated in this case as brightly above the average gray level as below it, the entire image content would be lost and appear as a blank gray screen to a viewer more than six screen heights from the display, since the spectral content is outside the range of human perceptivity, i.e. the human visual system would act as a diagonal low-pass filter.) The spectral location (O, $f_x$), after such two-dimensional modulation, will be at ($f_s/2$, $f_s/2-f_x$), and so on. The two-dimensional modulation to achieve folding around the diagonal can be implemented by reversing the polarity of every other pixel on every line, with the polarity order reversed every other line, as illustrated in FIGS. 12A and 12B. FIG. 12A shows a pixel array before two-dimensional modulation on the two-dimensional subcarrier, and FIG. 12B shows the pixel array after such modulation. FIG. 13 illustrates a circuit for implementing this modulation. A multiplexer 1350 receives, at one input, the pixel output of two-dimensional filter 865 and, at another input, the pixel output inverted by inverter 1310. The modulator receives pixel and line indications and alternates its input line selection sequence in accordance with the polarity sequence shown in FIG. 12B.

The encoded output of summing circuit 880 contains video signals representative of both images (see two-dimensional spectral sketch 880A which denotes the respective video signal spectra as 1 and 2), can be stored and/or transmitted, as represented by the block 890.

Figure 14:
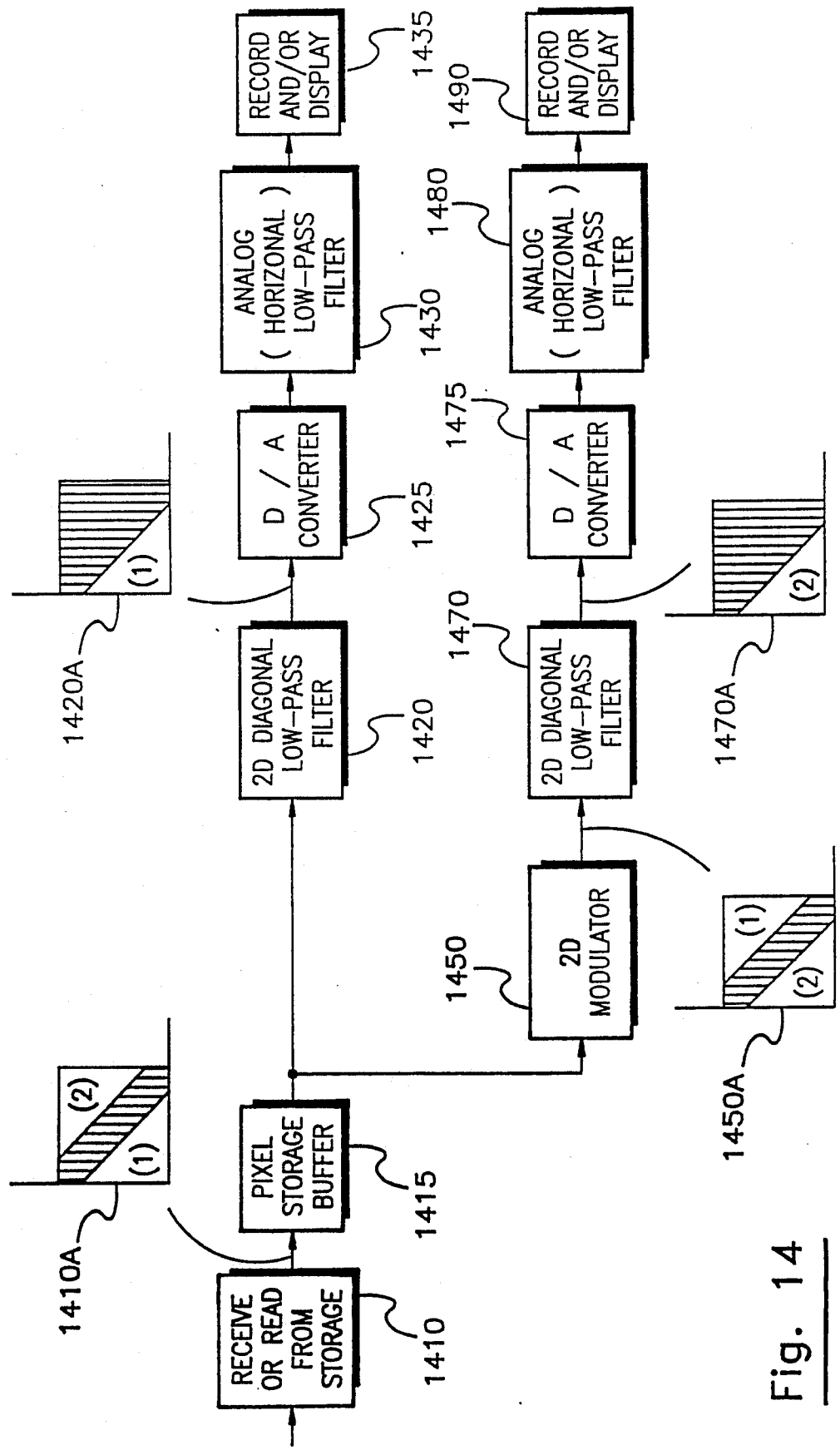
FIG. 14 shows a block diagram of an embodiment of a decoder and decoding method which can be utilized to recover signals encoded in accordance with a form of the invention.

Referring to FIG. 14, there is shown a block diagram of a decoder which can be utilized to recover and record and/or display the encoded video signals. The block 1410 represents the receiving of the encoded signal or the reading thereof from storage. The two-dimensional frequency spectrum is shown in the sketch at 1410A. An optional pixel storage buffer 1415 can be used to store frames of information or portions thereof. The output of buffer 1415 is coupled to a two-dimensional modulator which can operate in the same manner as modulator 865 (FIG. 8), as illustrated in conjunction with FIGS. 11-13. The previously described spectrum folding reverses the spectral positions of the video signals. The output of modulator 1450 is coupled to a two-dimensional diagonal low-pass filter 1470, which may again be of the type illustrated in conjunction with FIGS. 9-10. The output of buffer 1415 is also coupled to such a filter (1420). The respective outputs of two-dimensional low-pass filters 1420 and 1470 are coupled to digital-to-analog converters 1425 and 1475, and then to analog (horizontal) low-pass filters 1430 and 1480. The output analog video signals can be recorded and/or displayed, as represented by the blocks 1435 and 1490, respectively. In operation, it is seen that the two-dimensional modulator operates to "reverse" the spectral locations of the signals identified as "1" and "2" (see sketch 1450A). The filters 1420 and 1470 can then be utilized to filter undesired spectral components and obtain the respective separated video signals (see also sketches 1420A and 1470A). After conversion to analog form and suitable low-pass filtering, the recovered signals can be recorded and/or displayed, as desired.

Figure 15A:
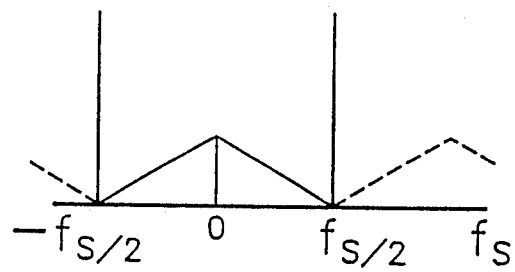
FIGS. 15A, 15B, 15C 15D and 15E shown illustrative spectra.
Figure 15B:
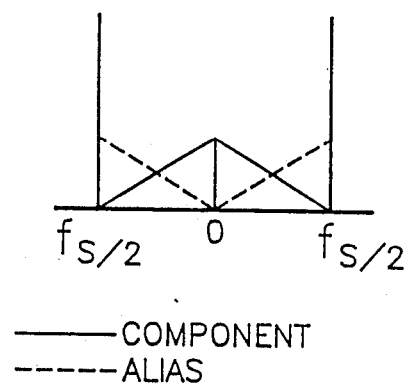

In accordance with a further form of the invention, the size of an image may be reduced, or squeezed, by sub-sampling after first filtering to remove frequencies which would otherwise cause aliasing. As will be described, an image can be reduced to half its original size by throwing away, or decimating, alternate pixels horizontally and vertically. Spatial decimation can also be used to reduce the data content and associated transmission bandwidth of non-squeezed images without substantially degrading the subjective resolution. Before considering two-dimensional decimation, it is helpful to examine the effects of one-dimensional decimation. If it is assumed that a continuous analog signal is sampled using a digitizer which has an infinitely small sampling aperture, the digitized input can be considered as a continuous analog signal multiplied by a series of impulses spaced $T_s$ seconds apart. The sampled spectrum consists of the original analog spectrum convolved with spectral impulses located at $nf_s$ where $f_s = 1/T_s$. Repetitions of the analog spectrum will thus be centered about integral multiples of the sampling frequency as shown in FIG. 15A. No aliasing will occur if the analog baseband spectrum is restricted to frequencies less than $f_s/2$ prior to sampling. Assume, now, that even and odd samples are separated using the following even and odd decimating functions:

$$DEC_{even} = (1/2)[1 + \cos 2\text{pi}*(f_s/2)(x/f_s)]$$
$$= (1/2)[1 + \cos(\text{pi}*x)]$$
$$DEC_{odd} = (1/2)[1 - \cos(\text{pi}*x)]$$
where $x$ = integral sample number Applying $DEC_{even}$ to the data set will force the odd data elements to zero while $DEC_{odd}$ will force the even elements to 0. The spectrum of an evenly decimated image is obtained by convolving the sampled spectrum with the spectrum of $DEC_{even}$. FIG. 15B shows that decimation causes another repetition of the analog spectrum to be created about $f_s/2$. Aliasing will occur for frequencies greater than $f_s/4$. $DEC_{odd}$ will create a similar spectrum, but the aliased components will be inverted with the respect to the aliased spectra from $DEC_{even}$. When the odd and even components are added, the unaliased original components add, but aliased components cancel, leaving the original spectrum. While this result is interesting, it is of little practical value in one dimension: the same result is obtained by sampling the analog input at $f_s/2$.

Spatial decimation, however, does not lead to the trivial result encountered in one dimension, provided a diagonal decimating pattern is used. A diagonal decimator masks an image with a checkerboard pattern of (e.g. black) dots. The even decimator can be represented as:

$$DEC_{diag} = (\tfrac{1}{2})[1 + \cos(pi^*x)\cos(pi^*y)]$$

Figure 15C:
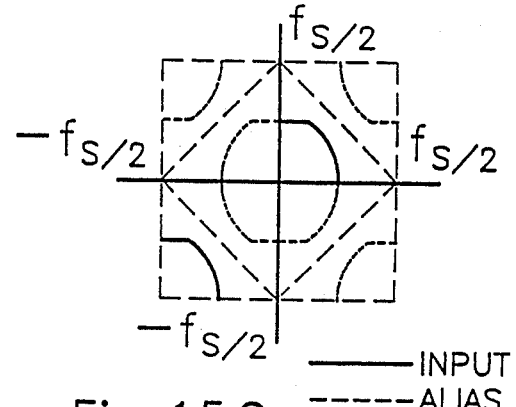

The spectrum of the decimator is composed of two frequencies, one at DC (O,O), the other at half the horizontal and vertical sampling rates $(f_h/2, f_v/2)$. It is analogous to the one-dimensional decimation spectrum except that frequencies are two-dimensional. An image to be decimated can be first passed through a two-dimensional diagonal pre-filter of the type previously described. The decimated spectrum is obtained by convolving the filtered image spectrum with the spectrum of the decimator. The original filtered spectrum is repeated about multiples of the decimating frequency, i.e.

$$(2m+1)f_s/2, (2n+1)f_s/2 \text{ for all m and n}$$

a portion of which is shown in FIG. 15C. Passing the decimated image through another diagonal filter regenerates the undecimated image without degrading the image quality. To summarize the foregoing discussion, when a diagonally pre-filtered image is spatially decimated diagonally the spectral components introduced by the decimation process do not extend into the original spectral region, and hence may be removed by filtering.

Diagonally decimated images contain half the number of pixels per line of cardinally sampled images. The time necessary to send a line of video can be reduced by half if the bandwidth is maintained constant, so that the image will be squeezed horizontally. The second half of each video line may then be used for other purposes, such as carrying a second image or carrying high definition components of the basic image. Squeezed images can be reconstructed at the receiver by reinserting the zeros created by the decimator and passing it through a two-dimensional low-pass filter.

Figure 15D:
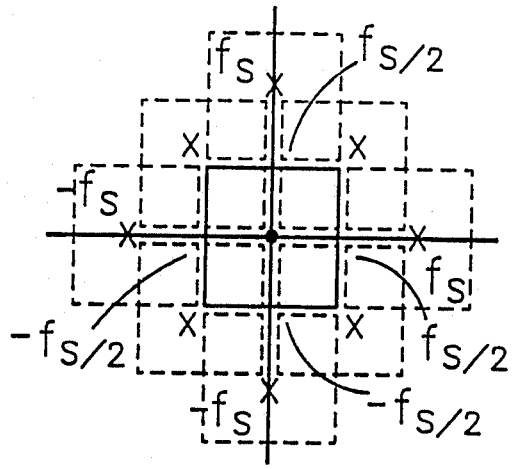

FIG. 15D is a representation of a two-dimensional frequency spectrum of a decimated image which is composed of repetitions of the cardinally-sampled spectrum about multiples of the decimating frequency, i.e. at $$(2m+1)f_{horizontal}/2, (2n+1)f_{vertical}/2$$

for all integral values of m and n.

Figure 15E:
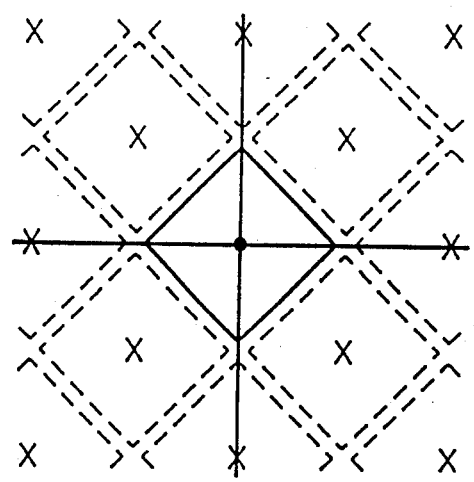

Frequency aliasing will occur if the image is not properly pre-filtered and likewise, if the zero-padded reconstruction is not adequately post-filtered. FIG. 15E shows that a two-dimensional filter with a diamond-shaped pass-band that can be used for both the pre- and post-filter. It removes only those spectral components outside the sensitivity range of the human visual system. Pictures with the same subjective quality of the original image can, therefore, be reconstructed from a diagonally-decimated image.

Figure 16:
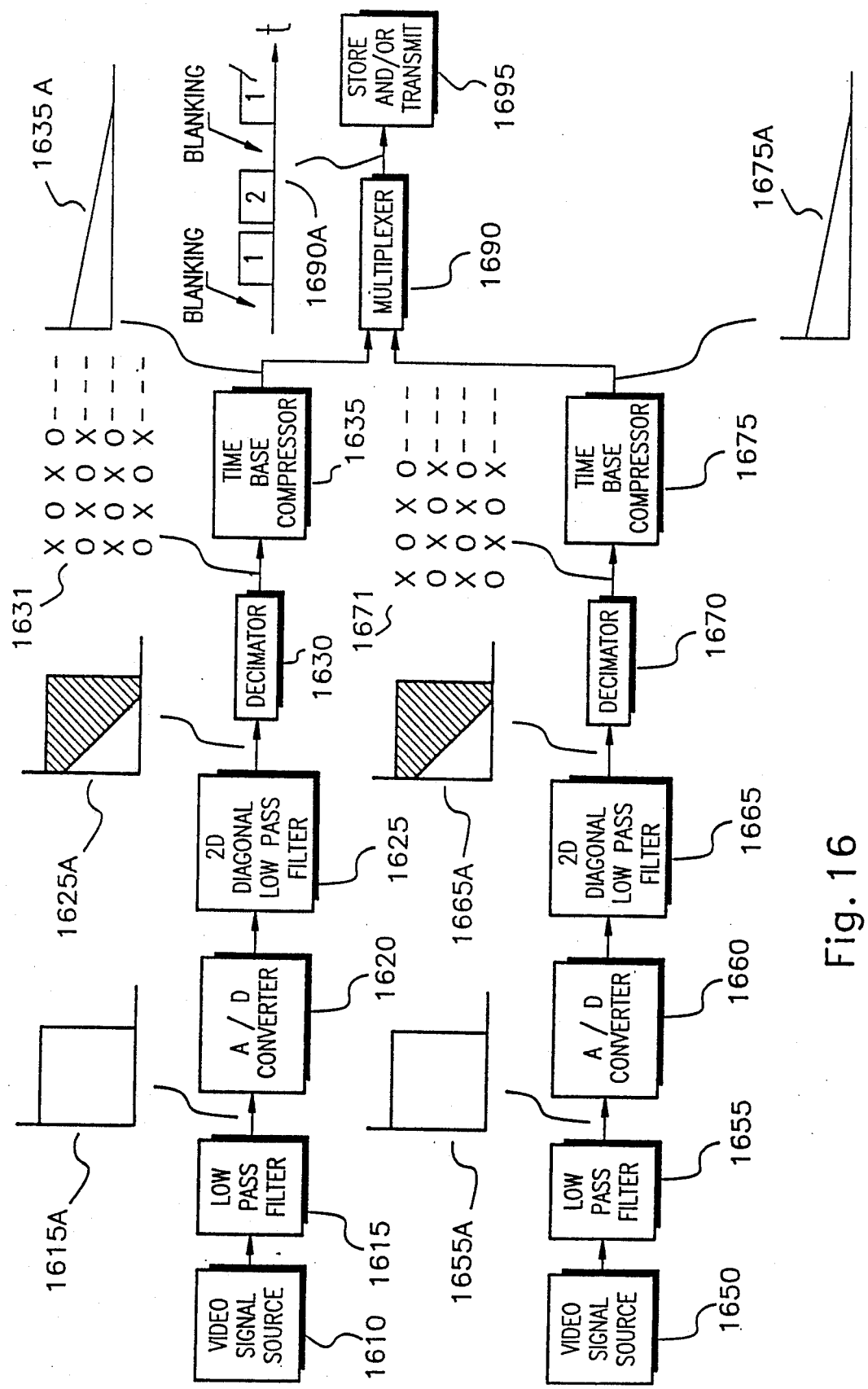
FIG. 16 is a block diagram of an embodiment of an encoder and encoding method in accordance with another form of the invention.
Figure 17:
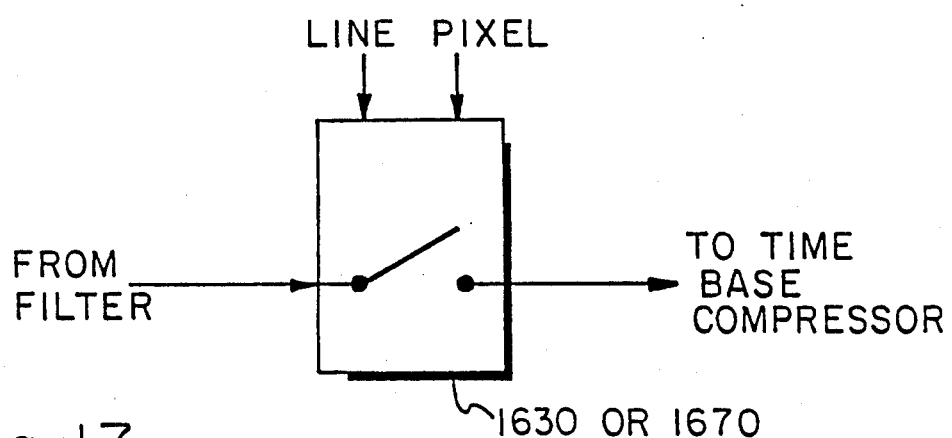
FIG. 17 is a diagram of a decimator which can be utilized in an embodiment of the invention.

Referring to FIG. 16, there is shown a block diagram of an embodiment of a form of the invention which utilizes principles just set forth. Two sources of video signal, 1610 and 1650 are provided, as previously described in conjunction with the description of FIG. 8. The signals are horizontally low-pass filtered and analog-to-digital converter as represented by the blocks 1615, 1620 and 1655, 1660, respectively (see also sketches 1615A and 1655A). The outputs of the analog-to-digital converters are respectively two-dimensionally low-pass filtered, such as in the manner previously described, as represented by the blocks 1625 and 1665. The resultant respective two-dimensional spectra are represented in sketches 1625A and 1665A. The filtered images are then decimated, in the manner previously described, as represented by the blocks 1630 and 1670, respectively. The pattern of pixels selected by the decimators are illustrated in the diagrams 1631 and 1671, respectively. In the present embodiment, only the selected alternate pixels (as illustrated) are passed by the decimators, and this can be implemented, for example, by using voltage-controlled gates as illustrated in FIG. 17. In particular, line and pixel information provided to the controlled gate determines whether the pixel is passed by the decimator. Alternatively, a flip-flop, which is set to a different initial status each line, could be utilized. The outputs of decimators 1630 and 1670 are respectively coupled to time base compressors 1635 and 1675 which operate to compress each line of pixels into respective halves of the original line time. Time base correction is very well known in the art, and any suitable time base compressor can be utilized for this purpose. The compressed two-dimensional spectra of the resultant signals are represented in sketches 1635A and 1675A, respectively. It is seen that the horizontal component is doubled. A multiplexer 1690 is then utilized to combine the signals during successive time slots, as illustrated in the diagram 1690A. The resultant signal can be stored and/or transmitted, as represented by the block 1695.

Figure 19:
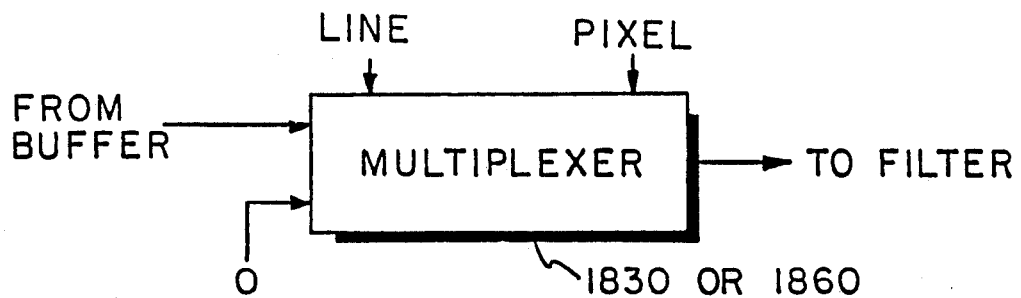
FIG. 19 is a diagram of a zero padder which can be utilized in embodiments of the invention.
Figure 18:
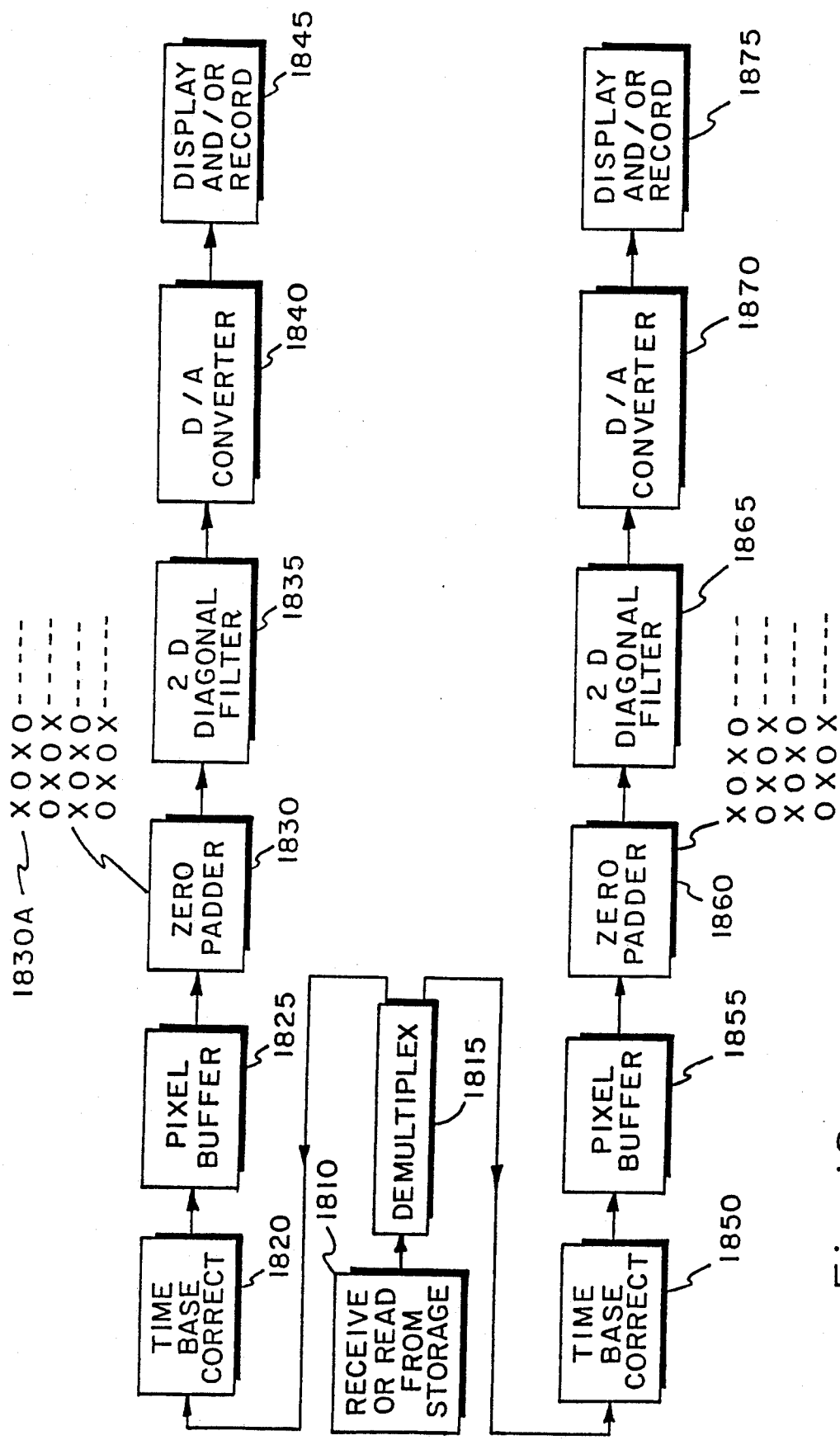
FIG. 18 is a block diagram of an embodiment of a decoder and decoding method which can be utilized to decode the encoded signals of a form of the invention.

Referring to FIG. 18, there is shown a block diagram of an embodiment of a decoder which can be utilized to decode the encoded video signals of the FIG. 16 circuit. The block 1810 represents the receiving or the reading from storage of the encoded signal. A demultiplexer 1815 is utilized to separate the signals in the two time slots of each line, and the demultiplexer outputs are respectively coupled to time base correction circuits 1820 and 1850, respectively, which perform the converse of the operations that were performed by corresponding time base correctors 1635 and 1675 in the encoder. The outputs of the time base correctors are respectively coupled to pixel storage buffers 1825 and 1855, and these may comprise, for example, half-frame stores. The outputs of the buffers are respectively coupled to zero padders 1830 and 1860 which operate to insert zeros at diagonally alternating pixel positions, as represented in the diagrams 1830A and 1860A, respectively. A circuit which can be utilized to implement the padders is illustrated in FIG. 19. In particular, a multiplexer can be utilized which receives, as inputs, the pixels output from the buffers (1825 or 1855) and a signal representative of a zero level. Selection of the value to be passed by the padder will depend on the line and pixel information input to the multiplexer, in accordance with the illustrated alternating pattern. The outputs of padders 1830 and 1860 are respectively coupled to two-dimensional diagonal low-pass filters 1835 and 1865, respectively, which, as previously described, operate to remove the aliasing components. The outputs of the filters are coupled to digital-to-analog converters 1840 and 1870, respectively, and then can be analog low-pass filtered (horizontally), if desired, and displayed and/or recorded, as represented by the blocks 1845 and 1875, respectively.

Figure 20:
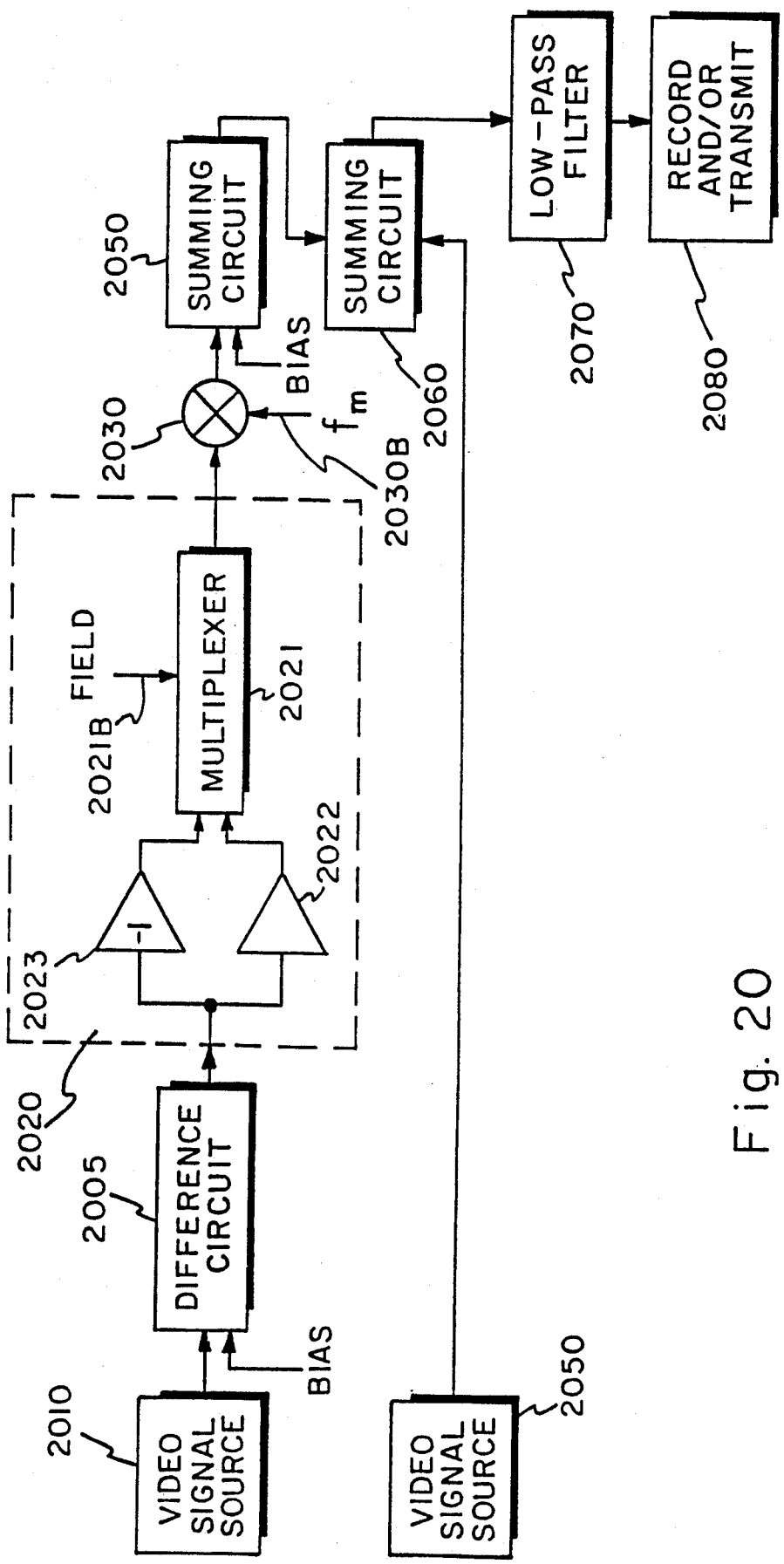
FIG. 20 is a block diagram of an embodiment of an encoder and encoding method in accordance with another form of the invention.

Referring to FIG. 20, there is shown an embodiment of a form of the invention wherein two video signals can be combined on a single channel with reduced bandwidth requirement, analog processing being utilized in this embodiment. As before, two video input signals are received from video signal sources (2010 and 2050). The present invention (in both digital and analog processing implementations) may sometimes be practiced without initial two-dimensional diagonal low-pass filtering, since most natural images have little spectral energy to begin with in the high diagonal frequency region of the spectrum. The embodiment of FIG. 20 is an example of processing without such prefiltering. In the embodiment of FIG. 20 it is assumed, also as an example, that the video comprises interlaced video. Also in this embodiment, the two-dimensional modulation is implemented by separate vertical and horizontal modulation. In particular, the block 2020 represents the vertical modulation. For an interlaced display, alternate lines occur in successive fields, so vertical modulation can be obtained by inverting during every other field. A multiplexer 2021, which is controlled on a line 2021B by a signal derived from field synchronization, selects either the video received via an amplifier 2022 or the video received via inverting amplifier 2023. The resultant "alternate line inverted" signal is used to drive a double balanced modulator (which implements the horizontal modulation component), the mixing frequency ($f_m$) of which, received on line 2030B, is selected as the maximum pass-band frequency, for example 4.2 MHz. In order to maintain the unipolar nature of the video, a bias equal to half the maximum unipolar video level is subtracted prior to encoding by difference circuit 2005, and is then reinserted after the modulation process, by summing circuit 2050. The modulated and unmodulated video signals are added by summing circuit 2060, low-pass filtered (block 2070) and recorded and/or transmitted (block 2080).

Figure 21:
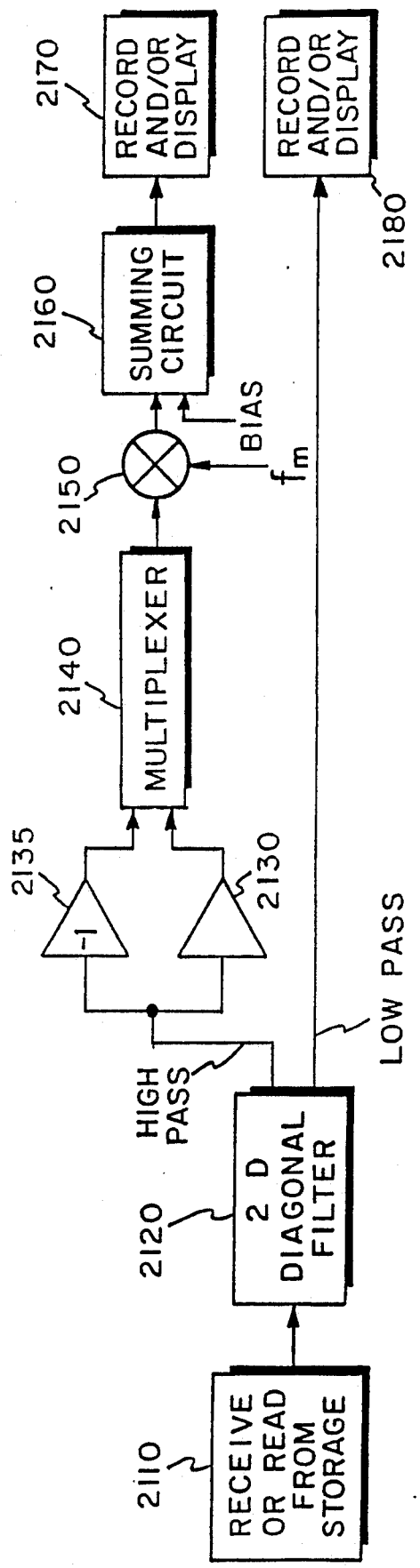
FIG. 21 is a block diagram of an embodiment of a decoder and decoding method which can be utilized to decode signals encoded in accordance with a further form of the invention.

Referring to FIG. 21, after storage and/or transmission, the combined signal is received and/or read from storage (block 2110), and can be decoded to recover the original signals. The combined signal is coupled to a two-dimensional diagonal filter 2120 to obtain the low two-dimensional diagonal frequencies on a line 2020C, and the high two-dimensional frequencies on a line 2020B. The diagonal filtering may be implemented in analog fashion or by converting to digital form, separating as above, and reconverting. The signal 2120C can be recorded and/or displayed, as represented by block 2180. The signal 2120B is two-dimensionally modulated, in one-dimensional stages analogous to the encoding process of FIG. 20. In particular, a multiplexer 2140, which is controlled on a line 2140B by a signal derived from field synchronization, selects either the output of an amplifier 2130 or of inverting amplifier 2135. The result is then passed through a double-balanced mixer 2150 which receives, as its other input, a signal at the same frequency as that used at the transmitter; i.e., a 4.2 MHz signal in this example. Bias can be suitably added by summing circuit 2160 and the resultant signal stored and/or displayed, as represented by block 2170.

Figure 22:
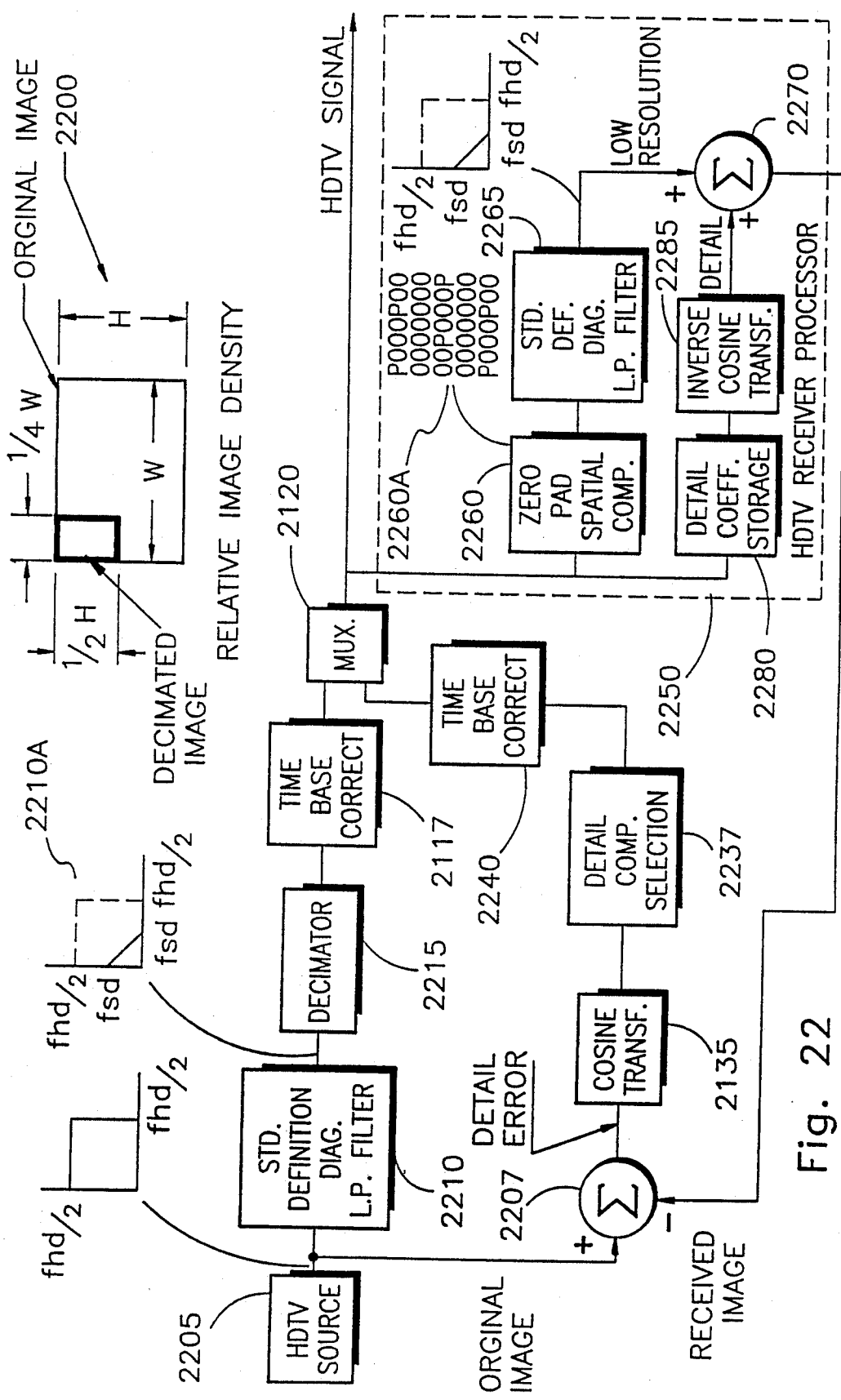
FIG. 22 is a block diagram of an embodiment of a high-definition television system and method in accordance with a further form of the invention.

The high frequency diagonal portion of the two-dimensional spectrum can also be utilized to carry components of the primary image (for example, high definition components, color components, additional image area to modify aspect ratio or for other purposes, etc.), or to carry other information such as data, still pictures, audio, etc. FIG. 22 is a block diagram of a high definition television system which two-dimensionally modulates the high definition television system which two-dimensionally modulates the high definition components into the high frequency two-dimensional diagonal region. A source of high definition (which can be considered as encompassing a signal with substantially higher definition than current conventional television video) 2205 is provided. The output thereof is coupled to the positive input of a difference circuit 2207, and to a block 2210 which represents two-dimensional low-pass diagonal filtering of the high-definition video signal. This filtering may be implemented, for example, as described above by converting to digital form and implementing the filtering as described above. The two-dimensional spectrum of the resultant signal is represented at 2210A, and it is seen that the original horizontal and vertical frequencies, at half the high definition sampling rate, are reduced to within the diagonal band at the lower frequency standard definition two-dimensional frequency cutoffs. The output of the filter 2210 is received by decimator 2215, which operates, in this embodiment to decimate every other vertical line and retain every fourth horizontal pixel. The pattern of decimation is illustrated in another part of the diagram at 2260, and it will be understood that this decimation can be achieved by the decimator previously illustrated, with the line and field inputs causing selection of the pixels to be retained in accordance with the desired pattern. The resultant relative image density is illustrated in the diagram at 2200. After time base correction in the manner previously described, the output of the decimator is coupled to one input of multiplexer 2120. The output of the multiplexer is coupled to a zero padder 2260 and to a storage buffer for storing detail coefficients. The output of zero padder 2260 reconstructs the pattern shown at 2260A, using a padder of the type previously illustrated. This signal is coupled to a standard definition two-dimensional diagonal low-pass filter 2265, which operates in the same manner as filter 2210, and produces a spectrum as illustrated at 2265A, without aliasing. The output of filter 2265 is one input to a summing circuit 2270. The other multiplexer output is coupled to detail coefficient storage buffer 2280 whose output is coupled to an inverse cosine transform circuit 2285, which may be a chip of the type described in the above referenced U.S. patent application Ser. No. 502,509. The output of circuit 2285 is the other input to summing circuit 2270. The output of summing circuit 2270 is, in turn, the negative input to difference circuit 2207 whose output is coupled to cosine transform circuit 2135, and the output of this circuit is coupled to a detail component selection circuit 2237. The circuits 2135 and 2137 may, again, be of the type described in the above referenced U.S. patent application Ser. No. 502,519. The output of circuit 2237 is time base corrected (block 2240), and is then the other input to multiplexer 2120. In operation, this circuit uses (as an example), selected transform components in the time slot made available by decimation. The decoder, after demultiplexing, can utilize circuitry in the dashed enclosure 2250 to recover the components of the signal and add them to obtain an HDTV output. It will be understood that the same principles could be applied for non-transformed detail components.

Figure 23:
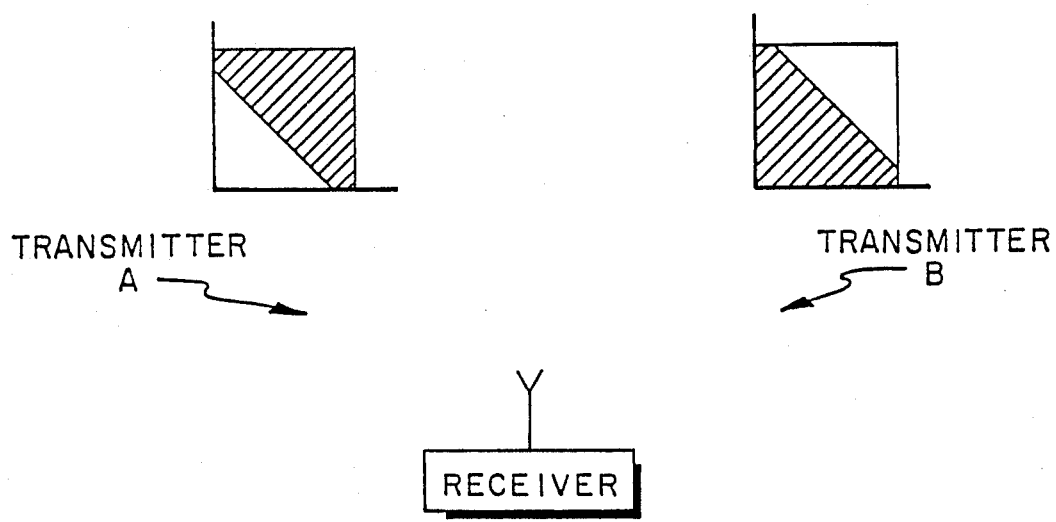
FIG. 23 illustrates a further form of the invention that is used to minimize interference between transmitted video signals.

It will also be understood that the two-dimensional modulation of video into the high frequency diagonal portion of the spectrum (for subsequent recovery) can be utilized to reduce interference between signals, for example in a co-channel situation. FIG. 23 illustrates transmitters A and B in separate broadcasting regions, and a receiver which can receive interfering signals from the transmitters. If one of the transmitters is utilizing a two-dimensionally modulated video signal (for subsequent conversion, as described above), perceived interference will be substantially reduced.

We claim:

1. A method for combining a first video signal representative of a first image and a second video signal representative of a second image, comprising the steps of:
    filtering said first video signal to remove high frequency two-dimensional diagonal frequency components therefrom;
    filtering said second video signal to remove high frequency two-dimensional diagonal frequency components therefrom;
    two-dimensionally modulating the filtered second video signal; and
    combining said filtered first video signal with said modulated filtered second video signal.

2. The method as defined by claim 1, wherein said first and second video signals are electronic video signals, and said first and second images are different images.

3. The method as defined by claim 2, wherein said step of two-dimensionally modulating the filtered second video signal comprises modulating said filtered second video signal on a two-dimensional carrier.

4. The method as defined by claim 3, said second video signal has a video sampling frequency associated therewith and wherein said two-dimensional carrier has a vertical frequency of about half the video sampling frequency of said second signal and a horizontal frequency of about half the sampling frequency of said second video signal.

5. The method as defined by claim 1, wherein said step of filtering said first video signal comprises filtering said video signal with a two-dimensional low-pass filter.

6. The method as defined by claim 1, wherein said step of filtering said second video signal comprises filtering said second video signal with a two-dimensional low-pass filter.

7. The method as defined by claim 5, wherein said step of filtering said second video signal comprises filtering said second video signal with a two-dimensional low-pass filter.

8. The method as defined by claim 7, wherein said step of two-dimensionally modulating the filtered second video signal comprises modulating said filtered second video signal on a two-dimensional carrier.

9. The method as defined by claim 8, said second video signal has a video sampling frequency associated therewith and, wherein said two-dimensional carrier has a vertical frequency of about half the video sampling frequency of said second signal and a horizontal frequency of about half the sampling frequency of said second video signal.

10. The method as defined by claim 2, wherein said step of two-dimensionally modulating the filtered second video signal comprises modulating said signal to obtain a two-dimensional frequency spectrum which does not substantially overlap with the two-dimensional frequency spectrum of the filtered first video signal.

11. The method as defined by claim 9, wherein said step of two-dimensionally modulating the filtered second video signal comprises modulating said signal to obtain a two-dimensional frequency spectrum which does not substantially overlap with the two-dimensional frequency spectrum of the filtered first video signal.

12. The method as defined by claim 10, wherein said step of filtering said first video signal to remove high frequency two-dimensional diagonal frequency components therefrom comprises filtering said first video signal to obtain a two-dimensional frequency spectrum within a substantially triangular boundary.

13. The method as defined by claim 11, wherein said step of filtering said first video signal to remove high frequency two-dimensional diagonal frequency components therefrom comprises filtering said first video signal to obtain a two-dimensional frequency spectrum within a substantially triangular boundary.

14. The method as defined by claim 12, wherein the shape of said boundary is approximately defined by $$f_v + f_h = constant$$

where $f_h$ and $f_v$ are, respectively, the maximum horizontal and vertical frequencies in said two-dimensional spectrum.

15. The method as defined by claim 13, wherein the shape of said boundary is approximately defined by $$f_v + f_h = constant$$

where $f_h$ and $f_v$ are, respectively, the maximum horizontal and vertical frequencies in said two-dimensional spectrum.

16. The method as defined by claim 2, wherein said step of combining said filtered first video signal with said modulated filtered second video signal comprises adding said filtered firs video signal and said modulated filtered second video signal.

17. The method as defined by claim 2, further comprising the step of storing the combined signal obtained from said combining step.

18. The method as defined by claim 2, further comprising the step of transmitting the combined signal obtained from said combining step.

19. A method as defined by claim 17, further comprising recovering said first video signal and second video signal from said combined signal.

20. A method as defined by claim 18, further comprising recovering said first video signal and second video signal from said combined signal.

21. The method as defined by claim 19, wherein said recovering comprises:
two-dimensional diagonal low pass filtering said combined signal to recover said first video signal; and
two-dimensionally modulating said combined signal and two-dimensional low pass filtering the resultant signal to recover said second video signal.

22. The method as defined by claim 19, wherein said recovering comprises:
two-dimensional diagonal low pas filtering said combined signal to recover said first video signal; and
two-dimensionally modulating said combined signal and two-dimensional low pass filtering the resultant signal to recover said second video signal.

23. The method as defined by claim 19, further comprising the steps of displaying said recovered first and second video signals.

24. The method as defined by claim 20, further comprising the steps of displaying said recovered first and second video signals.

25. For use in conjunction with a method for combining a first video signal representative of a first image and a second video signal representative of a second image, said method including the steps of: filtering said first video signal to remove high frequency two-dimensional diagonal frequency components therefrom; filtering said second video signal to remove high frequency two-dimensional diagonal frequency components therefrom; two-dimensionally modulating the filtered second video signal; and combining said filtered first video signal with said modulated filtered second video signal to produce a combined signal; a method for processing the combined signal to recover said first and second video signals, comprising the steps of:
two-dimensionally diagonal low pass filtering said combined signal to recover said first video signal; and
two-dimensionally modulating said combined signal and two-dimensional low pass filtering the resultant signal to recover said second video signal.

26. The method as defined by claim 25, further comprising the steps of displaying said recovered first and second video signals.

27. A method for combining a first video signal representative of a first image and a second video signal representative of a second different image, comprising the steps of:
two-dimensionally modulating said second video signal on a two-dimensional carrier, said two-dimensionally modulating including vertical modulation and horizontal modulation; and
combining said modulated second video signal with said first video signal.

28. Apparatus for combining a first video signal representative of a first image and a second video signal representative of a second different image, comprising:
means for two-dimensionally modulating said second video signal on a two-dimensional carrier, said two-dimensionally modulating including vertical modulation and horizontal modulation; and
means for combining said modulated second video signal with said first video signal.

29. A method for encoding a video signal, comprising the steps of:
frequency separating the signal into first and second portions by two-dimensional diagonal filtering;
two-dimensionally modulating the second portion on a two-dimensional carrier, said two dimensional modulating including vertical modulation and horizontal modulation; and
combining the first portion and the modulated second portion.

30. The method as defined by claim 29, wherein said second portion comprises signals having higher frequency than the signals of said fist portion.

31. A method for transmitting electronic video signals with improved interference immunity, comprising the steps of:
filtering at least one of said electronic video signals to remove high frequency two-dimensional diagonal frequency components therefrom;
two-dimensionally modulating the filtered video signal on a two-dimensional subcarrier, said two dimensional modulating including vertical modulation and horizontal modulation; and
transmitting the at least one filtered and modulated video signal.

32. A method for encoding and transmitting a plurality of electronic video signals with improved interference immunity, comprising the steps of:
filtering at least one of said electronic video signals to remove high frequency two-dimensional diagonal frequency components therefrom;

transmitting said at least one filtered video signal;

filtering at least a further one of said electronic video signals to remove high frequency two-dimensional diagonal frequency components therefrom;

two-dimensionally modulating said filtered at least further one of said video signals on a two-dimensional subcarrier, said two dimensional modulating including vertical modulation and horizontal modulation; and transmitting the modulated and filtered at least further one of said video signals.

33. A method for combining a first video si representative of a first image and a second video signal representative of a second image, comprising the steps of:

filtering said first video signal to remove high frequency two-dimensional diagonal frequency components therefrom;

filtering said second video signal to remove high frequency two-dimensional diagonal frequency components therefrom;

spatially decimating the filtered first video signal;

spatially decimating the filtered second video signal; and combining the spatially decimated first video signal with the spatially decimated second video signal.

34. The method as defined by claim 33, further comprising time base correcting said spatially decimated signals before the combining thereof.

35. The method as defined by claim 33, further comprising the step of transmitting the combined signal obtained from said combining step.

36. The method as defined by claim 35, further comprising receiving the transmitted combined signal and recovering said first video signal and second video signal from said received combined signal.

* * * * *